(12) United States Patent
Seungpyo

(10) Patent No.: US 6,767,302 B2
(45) Date of Patent: Jul. 27, 2004

(54) HYDRAULIC TENSIONER

(75) Inventor: Shin Seungpyo, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 60 days.

(21) Appl. No.: 10/314,692

(22) Filed: Dec. 9, 2002

(65) Prior Publication Data

US 2003/0114260 A1 Jun. 19, 2003

(30) Foreign Application Priority Data

Dec. 14, 2001 (JP) ........................................ 2001-381280

(51) Int. Cl.$^7$ ................................................ F16H 7/22
(52) U.S. Cl. .................................... 474/109; 474/101
(58) Field of Search .............................. 474/101, 109, 474/110, 111

(56) References Cited

U.S. PATENT DOCUMENTS

| | | | | |
|---|---|---|---|---|
| 5,304,099 A | * | 4/1994 | Deppe et al. | 474/110 |
| 5,346,436 A | * | 9/1994 | Hunter et al. | 474/110 |
| 5,366,415 A | * | 11/1994 | Church et al. | 474/110 |
| 6,120,402 A | * | 9/2000 | Preston et al. | 474/109 |
| 6,634,973 B1 | * | 10/2003 | Simpson et al. | 474/109 |

FOREIGN PATENT DOCUMENTS

| | | |
|---|---|---|
| JP | 2000-136859 | 5/2000 |
| JP | 2001-304360 | 10/2001 |

* cited by examiner

Primary Examiner—David A. Bucci
Assistant Examiner—Vicky A. Johnson
(74) Attorney, Agent, or Firm—Brown & Michaels PC; Greg Dziegielewski

(57) ABSTRACT

A hydraulic tensioner that decreases the number of components, secures an adequate backlash, and prevents backward movement of a plunger. The hydraulic tensioner includes a hollow plunger having rack teeth formed on a portion of an outer circumferential surface, slidably received in a bore of the housing, where the plunger has an inner space to form a fluid chamber with the bore. A slider housing portion, having an inclined surface, located in the housing, receives a wedge-shaped slider having a ratchet portion adapted to engage with the rack teeth of the plunger and a second side surface. The wedge-shaped slider being slidable along the inclined surface of the slider housing portion in a direction crossing an axial centerline of the plunger. The hydraulic tensioner further includes a first spring biasing the plunger in a protruding direction, and a second spring biasing the slider such that the slider moves along the inclined slide surface of the slider housing portion. A "wedge-effect" prevents the plunger from moving backwards.

7 Claims, 5 Drawing Sheets

HYDRAULIC TENSIONER

BACKGROUND OF THE INVENTION

1. Field of the Invention

The invention pertains to the field of tensioners for imparting tension to a chain, belt or the like. More particularly, the invention pertains to a tensioner having a ratchet mechanism, including a slider, to prevent a plunger's retraction when hydraulic pressure is decreased.

2. Description of Related Art

A hydraulic tensioner generally includes a housing, a hollow plunger that is fitted slidably into a bore formed in the housing, where the plunger is biased in a protruding direction by a spring, and a fluid chamber defined by the bore of the housing and the plunger. During operation, the force is exerted by a chain or belt on the distal end of the plunger, which balances the elastic force of the spring and hydraulic force in the fluid chamber.

When a force is exerted by a chain on the distal end of a plunger, an inadequate amount of hydraulic pressure is present in the chamber. This force is exerted at the time of engine start. As a result, the plunger is easily forced to retract into the housing, causing noise or oscillation. In order to prevent such a retraction of a plunger, various kinds of hydraulic tensioners with ratchet mechanisms have been proposed, such as shown in Japanese patent application laying-open publication Nos. 2000-136856 and 2001-304360.

The hydraulic tensioner shown in Japanese Publication No. 2000-136856 includes a rack supported translatably in a longitudinal hole formed in a housing, a ratchet fitted slidably in a lateral cavity formed in the housing, a rack which is engaged by the ratchet, and a spring fitted in the cavity, which biases the ratchet in an engaging direction with the rack. The ratchet moves in a the direction perpendicular to the movement of the rack at the time of protrusion of the plunger. One problem associated with this tensioner is that the rack is discrete from the plunger, such that the tensioner has an increased number of components. Additionally, in the case of the chain having a relatively long center distance, there exists a demand for increasing a backlash of a ratchet mechanism in some degree, but the above-mentioned tensioner has a drawback in that the backlash of the ratchet mechanism cannot be enlarged more than the backlash between the rack and the ratchet.

Japanese Publication No. 2001-304360 shows a hydraulic tensioner that includes a rack groove formed on the circumference of a piston. A claw member is adapted to engage the rack groove and slidably fits in a lateral hole. The lateral hole extends in a direction that crosses the axial centerline of the piston in the housing, via a predetermined clearance with an inside wall surface of the lateral hole. The tensioner also includes a spring that fits in the lateral hole that biases the claw member in the engagement direction with the rack. The claw member moves in the direction diagonal to the movement of the rack teeth at the time of protrusion of the piston. However, the amount of movement of the claw member does not fully contribute to the increase of the backlash. In this tensioner, it may be possible to enlarge the backlash of the ratchet mechanism more than the backlash present between the rack groove and the claw member by providing a predetermined clearance between the claw member and the inside wall surface of the lateral hole. However, increasing the backlash may cause chattering due to too great a clearance between the claw member and the lateral hole. Thus increasing the amount of clearance does not increase the backlash of the ratchet mechanism an adequate amount.

The present invention provides a hydraulic tensioner with a ratchet mechanism, that can reduce the number of components, ensure an adequate backlash, securely prevent a plunger's retraction, and address the above problems found in the prior art.

SUMMARY OF THE INVENTION

A hydraulic tensioner according to one aspect of the present invention includes a housing having a central bore that opens at one end thereof, a hollow plunger slidably received in the bore of the housing, the plunger having an inside space that defines a fluid chamber with the bore and rack teeth that are formed at least at a portion of the outer circumference of the plunger. The rack teeth formed on the outer circumference of the plunger, eliminating the need to provide a separate rack member and plunger, thereby reducing the number of components of the tensioner.

The tensioner further includes a first biasing member that biases the plunger in a protruding direction, a wedge-shaped slider adapted to permit travel of the plunger in the protruding direction but to prevent travel of the plunger in a backward direction by developing a "wedge-effect" at the time of retraction of the plunger, and a second biasing member that biases the slider in a direction of engagement of the ratchet portion with the rack teeth. The slider has a ratchet portion engageable with the rack teeth of the plunger on a first side surface. The slider is slidable in a direction intersecting an axial centerline of the plunger along an inclined surface formed on a second side surface opposite the first side surface.

The housing has a supporting block formed with a slider housing portion, the slider housing portion has an inclined slide surface that the inclined surface of the slider slidably contacts, and a second biasing member biases the slider in such a way that the slider moves along the inclined slide surface. The slider housing portion has a stop surface adapted to contact a rear side surface of the slider to block travel of the slider in a backward direction. Thereby, the movement of the slider, and thus the plunger during retraction of the plunger can be securely prevented. The slider housing portion also has a front facing wall oppositely disposed to a front side surface of the slider, and one end of the second biasing member contacts the front facing wall and the other end thereof contacts the front side surface of the slider. At the time of movement of the slider, the slider is guided by the inclined slide surface formed in the slider housing portion of the supporting block under the action of the force of the second biasing member, thus making the movement of the slider smoothly.

The second biasing member may be a coil spring where the axial centerline is disposed parallel to the inclined side surface of the slider housing portion. In this case, the biasing force of the coil spring can be transmitted to the slider without any loss of contact between the inclined surface of the slider and the slide surface of the supporting block maintained. Thereby, the slider and the second biasing member are integrated and housed inside the supporting block, thus facilitating assembly of the tensioner.

When the plunger travels in the protruding direction during operation of the tensioner, the slider slides along the inclined surface through engagement between the rack teeth of the plunger and the ratchet portion of the slider, thereby increasing the whole backlash, correspondingly to the amount of sliding movement, allowing an adequate backlash to be secured. The plunger is prevented from retracting by a "wedge-effect," which is present at the time of backward movement of the plunger by a wedge shaped slider.

The housing further contains a first through hole adapted to insert a disengaging pin thereinto between the rear side surface of the slider and the rear stop surface of the slider housing portion in order to disengage engagement of the ratchet portion of the slider with the rack teeth of the plunger. Also, the housing has a second through hole adapted to insert a retaining pin thereinto between the front side surface of the slider and the front facing wall of the slider housing portion in order to retain the plunger in a retracted state. Engagement of the slider with the rack teeth of the plunger can be easily disengaged by inserting the disengaging pin into the first through hole. By this disengagement, a worker can easily push the plunger into the housing before transportation of the tensioner. Then, from this condition, by inserting the retaining pin into the second through hole, the retracted condition of the plunger can be maintained with ease, thereby facilitating assembly of the tensioner into a chain. Additionally, after assembly into the chain, the tensioner is placed in an operatable state by removing the retaining pin.

The disengaging pin and the retaining pin are preferably the same pin with a tapped distal end. In this case, insertion of the pin into a clearance between the rear end surface of the slider and the stop surface of the slider housing portion, and into a clearance between the front end surface of the slider and the wall surface of the slider housing portion can be conducted with ease. Also, the use of only one pin as a disengaging pin and a retaining pin decreases the number of components.

A check valve may be provided at a bottom portion of the central bore of the housing to permit fluid flow into the chamber but to block reverse flow of fluid, thereby, securely preventing the retraction of the plunger.

DETAILED DESCRIPTION OF THE INVENTION

Figure 1:
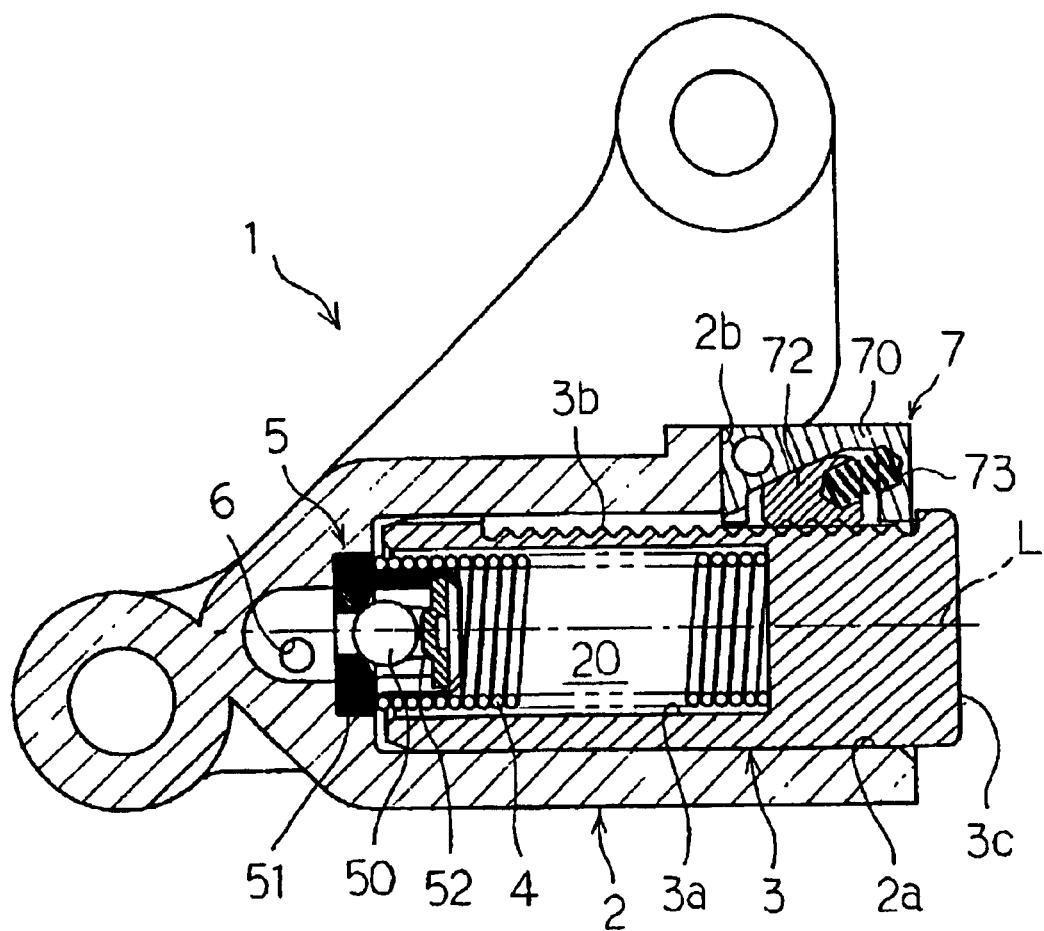
FIG. 1 shows a longitudinal sectional view of a hydraulic tensioner according to an embodiment of the present invention.

As shown in FIG. 1, a hydraulic tensioner 1 includes a housing 2, a hollow plunger 3 fitted slidably in a bore 2a formed in the housing 2, and a spring 4 as a first biasing member that biases the hollow plunger 3 in a protruding direction from the bore 2.

In the housing 2, a fluid chamber 20 is formed by an inner space 3a formed in the plunger 3 and an inside wall surface of the bore 2a. A check valve 5 is provided at the bottom portion of the bore 2a in the housing 2 to permit the flow of fluid into the chamber 20 but to block fluid flow in a reverse direction. The check valve 5 is comprised of a ball 50, a ball seat 51 contacted by the ball 50, and a ball spring 52 biasing the ball 50 toward the ball seat 51. Any other suitable structure can be employed to form a check valve. The housing 2 also has a fluid passage 6 to connect the chamber 20 with an outer source of pressurized fluid (not shown).

Figure 2:
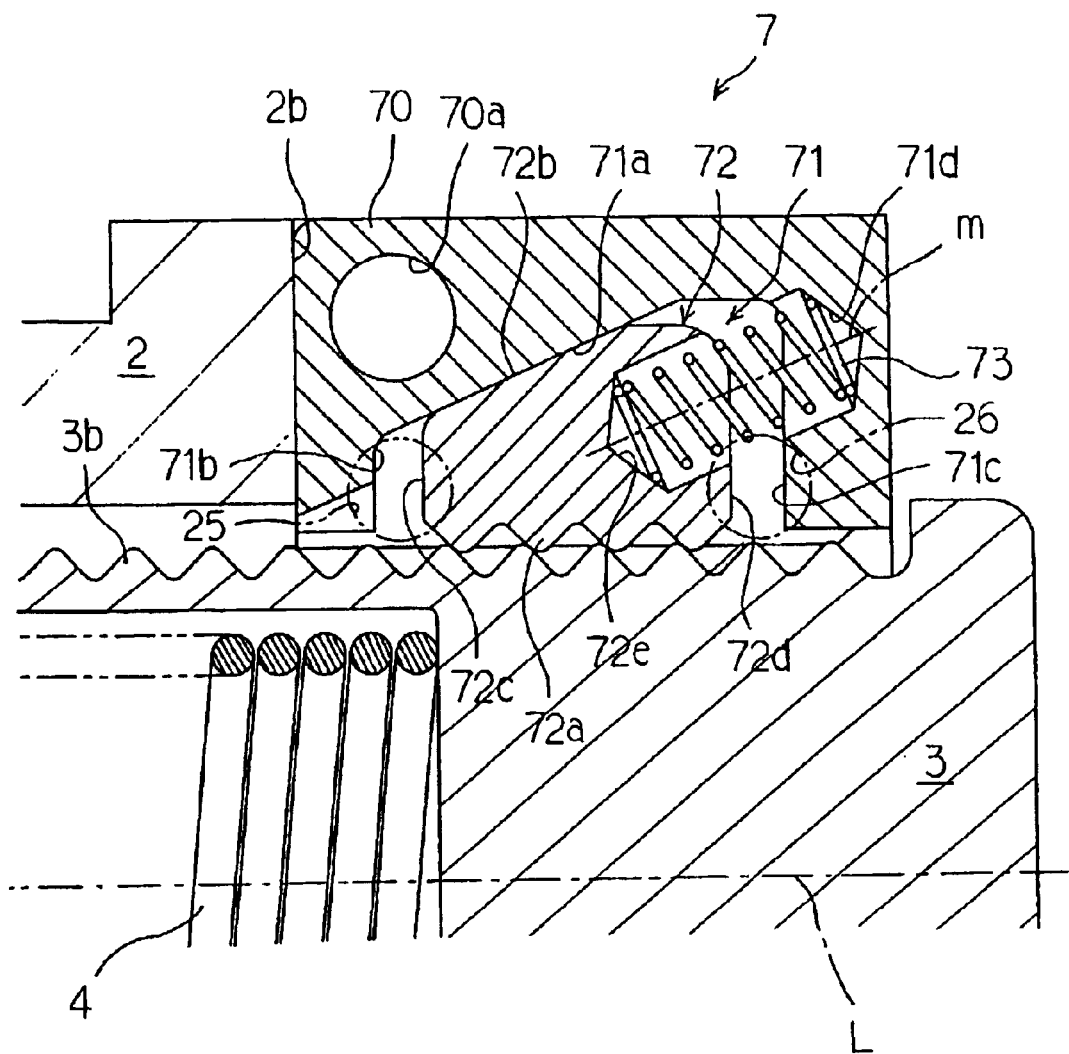
FIG. 2 shows an enlarged view of a ratchet mechanism of the hydraulic tensioner in FIG. 1.

Rack teeth 3b are formed on a portion of the outer circumference of the plunger 3. A ratchet mechanism 7 is provided at an open portion of the bore 2a to prevent retraction of the plunger 3. The ratchet mechanism 7, shown in FIG. 2, is comprised of a supporting block 70 that is disposed in a notch portion 2b formed at the open portion of the bore 2a, a wedge-shaped slider 72 is disposed in a slider housing portion 71 concavely formed in the supporting block 70 where the ratchet portion 72a is engagable with the rack teeth 3b of the plunger 3 on a first side surface, and a spring 73 as a second biasing member biases the slider 72 in such a way that the ratchet portion 72a of the slider 72 engages with the rack teeth 3b.

The supporting block 70 has a through hole 70a to insert a bolt (not shown) thereinto, and is fixed in the notch portion 2b of the housing 2 via the bolt. The slider 72 has an inclined surface 72b at a second side surface opposite the first side surface containing the ratchet portion 72a. The slider housing portion 71 has an inclined slide surface 71a that the inclined surface 72b of the slider 72 slidably contacts. The slide surface 71a extends in a direction that intersects the axial centerline L of the plunger 3. The distance between the slide surface 71a and the axial centerline L of the plunger 3 gradually decreases as it goes toward the rearward direction of the plunger 3 (i.e. lefthand direction of FIG. 2). The angle between the slide surface 71a and the axial centerline L of the plunger 3 is preferably 45 degrees or less. In this embodiment, the angle is predetermined to be about 30 degrees to ensure an adequate backlash in the ratchet mechanism 7.

The slider 72 has a rear end surface 72c and a front end surface 72d oppositely disposed between the first and second side surfaces. The slider housing portion 71 has a stop surface 71b disposed opposite the rear end surface 72c of the slider 72 and is adapted to prevent the movement of the slider 72 by contacting the rear end surface 72c of the slider 72 at the time of retraction of the plunger 3. The slider housing portion 71 also has a wall surface 71c contraposed to the front end surface 72d of the slider 72. Formed on the front end surface 72d of the slider 72, one end of the spring 73 engages with a concave portion 72e and the other end thereof engages with a concave portion 71d formed on the wall surface 71c. In this embodiment, a coil spring is preferably employed as the spring 73. An axial centerline m of the spring 73 is preferably disposed parallel to the slide surface 71a of the slider housing portion 71, so that contact of the inclined surface 72b of the slider 72 with the slide surface 71a may be maintained and the force of the spring 73 transmitted to the slider 72 without any loss.

The ratchet mechanism 7 permits the travel of the plunger 3 in the protruding direction (i.e. righthand direction of FIG. 2), and prevents the retraction of the plunger 3 by developing a "wedge-effect" between the slider housing portion 71 and the outer circumference of the plunger 3 at the time of retraction of the plunger 3. Due to the integration of the slider 72 and the spring 73 into the supporting block 70, the assembly of the tensioner is conducted with ease.

Figure 3:
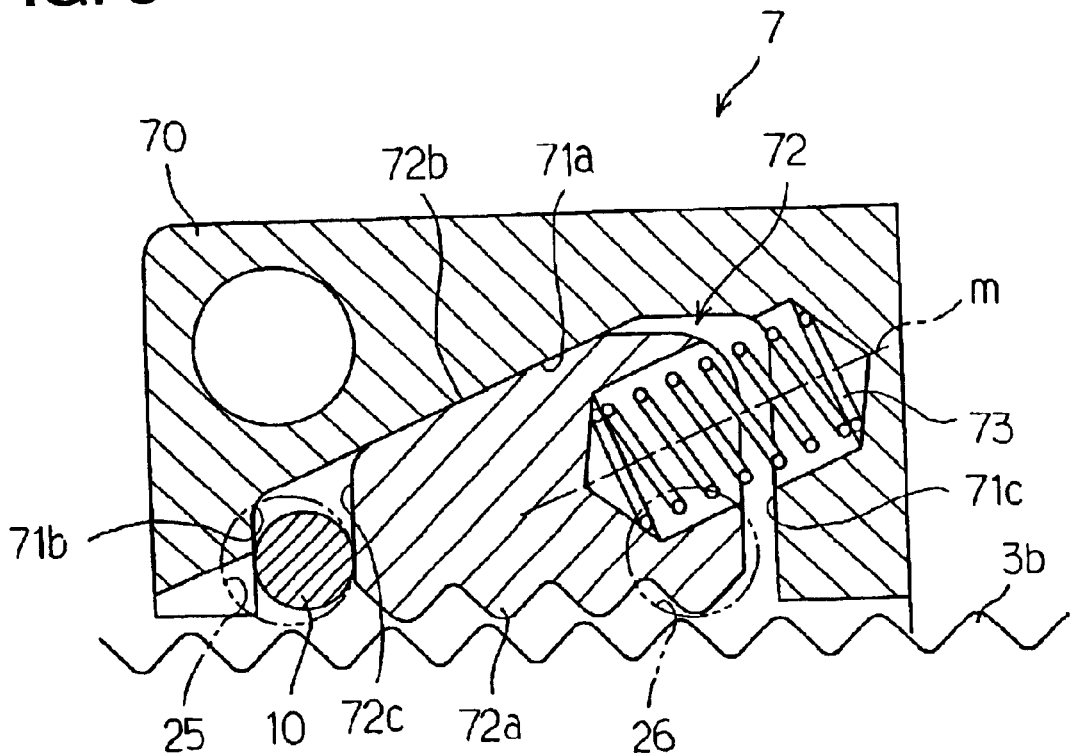
FIG. 3 shows a detail illustrating a ratchet mechanism and a disengaging pin.
Figure 4:
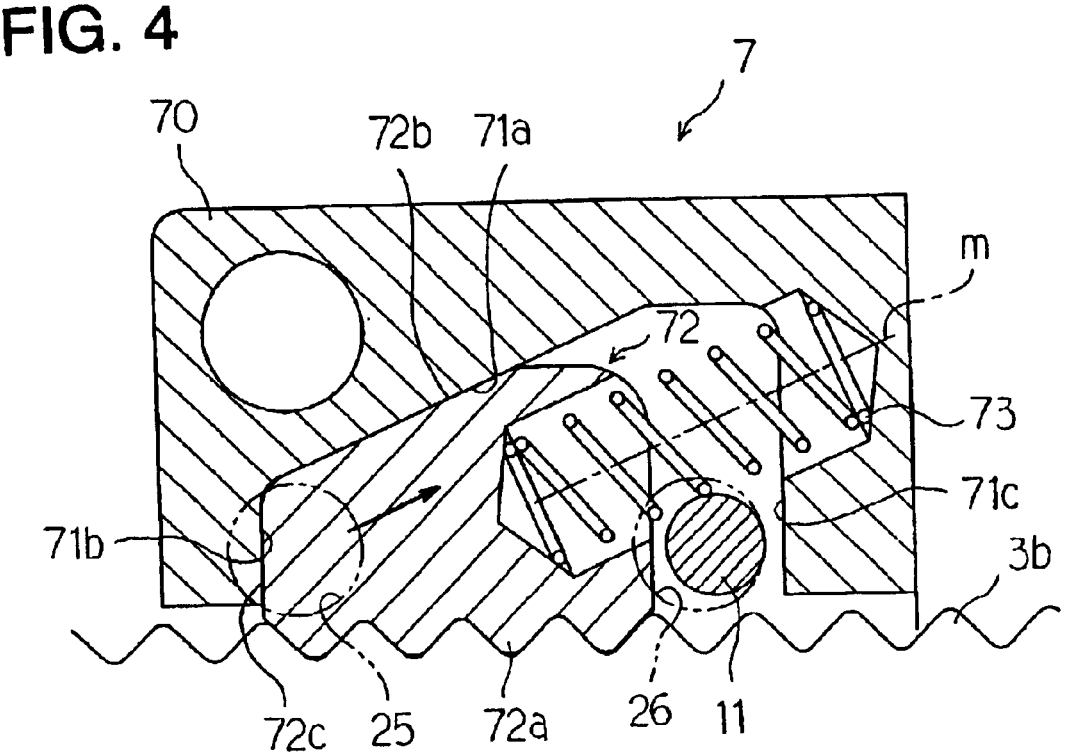
FIG. 4 shows a detail illustrating a ratchet mechanism and a retaining pin.
Figure 5:
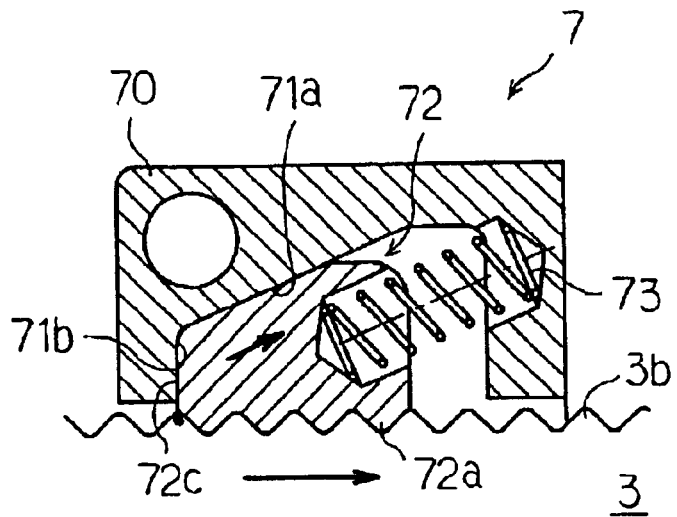
FIG. 5 shows a detail illustrating the operation of the ratchet mechanism at the time of protrusion of the plunger.
Figure 6:
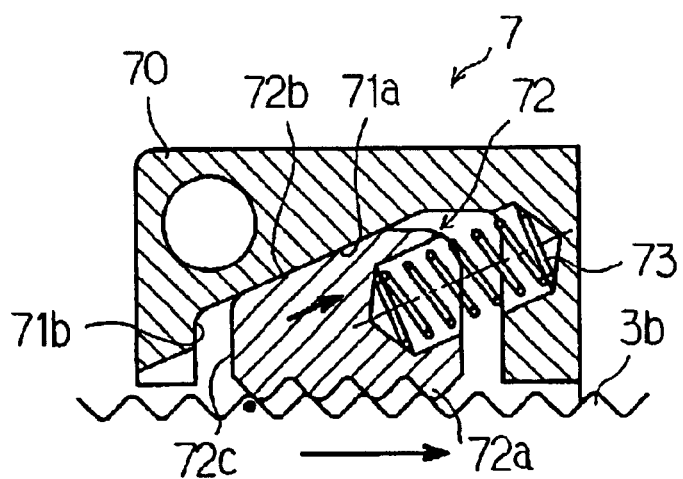
FIG. 6 shows a detail illustrating the operation of the ratchet mechanism at the time of protrusion of the plunger.

The housing 2 has a first and second through hole 25, 26 formed therein to penetrate the outer circumference of the housing 2 in a direction perpendicular to the axial direction (i.e. a direction perpendicular to the page). The first through hole 25 is disposed on the rear end side of the slider housing portion 71 and the second through hole 26 is disposed on the front end side of the slider housing portion 71. As shown in FIG. 3, the first through hole 25 is a hole adapted to insert a disengaging pin 10 thereinto to disengage the engagement present between the ratchet portion 72a of the slider 72 and the rack teeth 3b of the plunger 3. The second through hole 26, shown in FIG. 4, is a hole adapted to insert a retaining pin 11 thereinto to maintain the plunger 3 in a retracted state. Both the disengaging pin 10 and the retaining pin 11 have tapered distal ends. In addition, a single, common pin may be provided for the disengaging pin 10 and the retaining pin 11, thus reducing the number of components of the tensioner 1.

Figure 7:
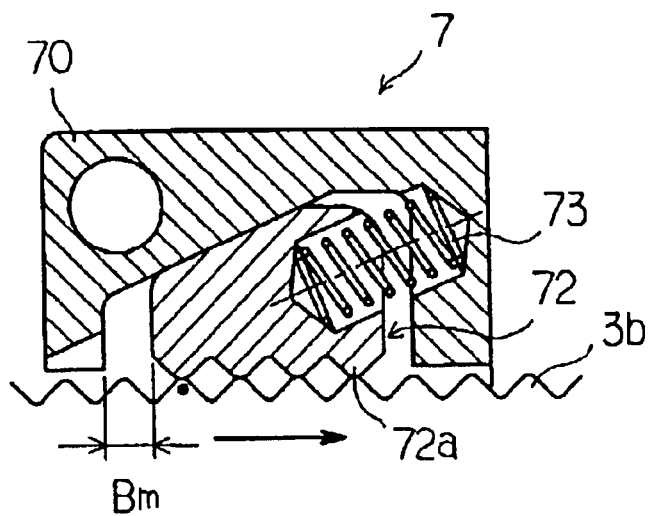
FIG. 7 shows a detail illustrating the operation of the ratchet mechanism at the time of protrusion of the plunger.

When the engine starts, engine oil is supplied in the fluid chamber 20 of the housing 2 through the check valve 5 from the oil passage 6. When the engine oil fills the chamber 20, hydraulic pressure of the oil causes the plunger 3 to move in a protruding direction. As the plunger 3 starts to move in the protruding direction from the engaging state of the rack teeth 3b of the plunger 3 with the ratchet portion 72a of the slider 72, shown in FIG. 5, the slider 72 starts to travel, in the direction marked by the arrow, against the force of the spring 73 through the engagement of the ratchet portion 72a with the rack teeth 3b along the slide surface 71a of the supporting block 70. In FIGS. 5 and 6–10, a dot is marked on a portion of the rack teeth 3b of the plunger 3 for the purpose of visualizing the movement of the plunger 3. As the slider 72 moves, shown in FIG. 6, the ratchet portion 72a of the slider 72 starts to ride on the rack teeth 3b of the plunger 3. When the slider 72 further travels in accordance with the movement of the plunger 3, as shown in FIG. 7, the ratchet portion 72a of the slider 72 rides on the tip of the rack teeth 3b of the plunger 3. At this time, a clearance Bm between the rear end surface 72c of the slider 72 and the stop surface 71b of the supporting block 70 is the maximum backlash of the ratchet mechanism 7. During operation of the tensioner, the slider 72 travels within the range of the maximum backlash Bm.

Figure 8:
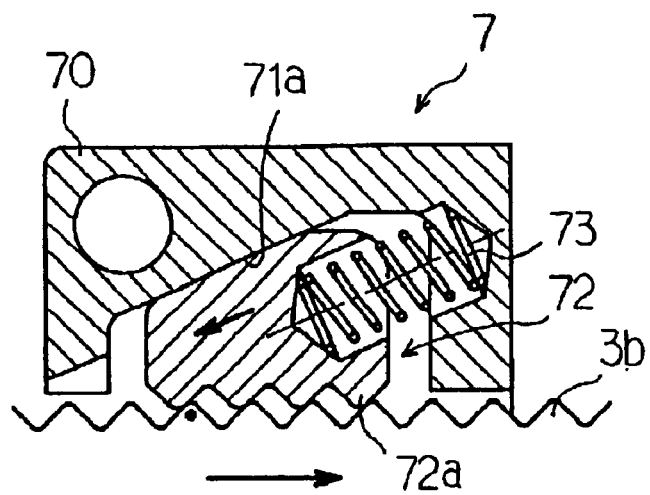
FIG. 8 shows a detail illustrating the operation of the ratchet mechanism at the time of protrusion of the plunger.
Figure 9:
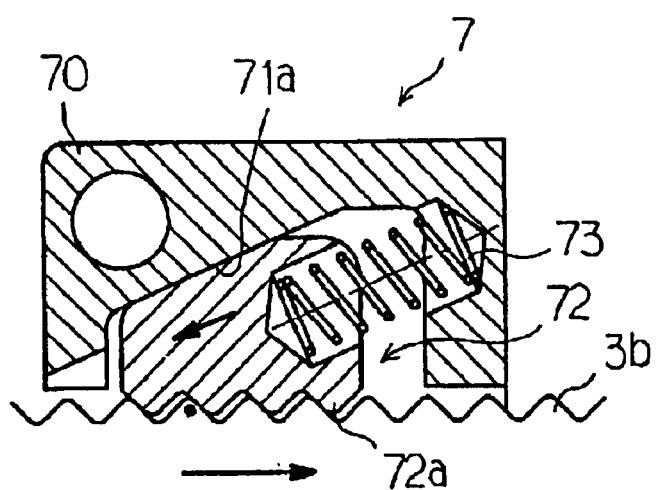
FIG. 9 shows a detail illustrating the operation of the ratchet mechanism at the time of protrusion of the plunger.

When the plunger 3 travels further in the protruding direction from the state shown in FIG. 7, the rack teeth 3b of the plunger 3 pass over the crest of the teeth of the ratchet portion 72a of the slider 72, as shown in FIG. 8. Then, the slider 72 begins to travel in a reverse direction or in the direction marked by the arrow in FIG. 8, along the slide surface 71a of the supporting block 71 by an elastic force of the spring 73. Thereafter, shown in FIG. 9, the slider 72 stops traveling when the teeth of the ratchet portion 72a of the slider 72 engages the rack teeth 3b of the plunger 3. Additionally, in the case of further movement of the plunger 3 in the protruding direction, the action shown in FIGS. 6–9 is conducted repeatedly.

When tension in the chain increases and a compressive force acts upon the distal end portion 3c by the chain, the ball check valve 6 closes and hydraulic pressure in the chamber 20 is imparted upon the plunger 3 as a resistant force, thereby preventing the backward movement of the plunger 3.

Figure 10:
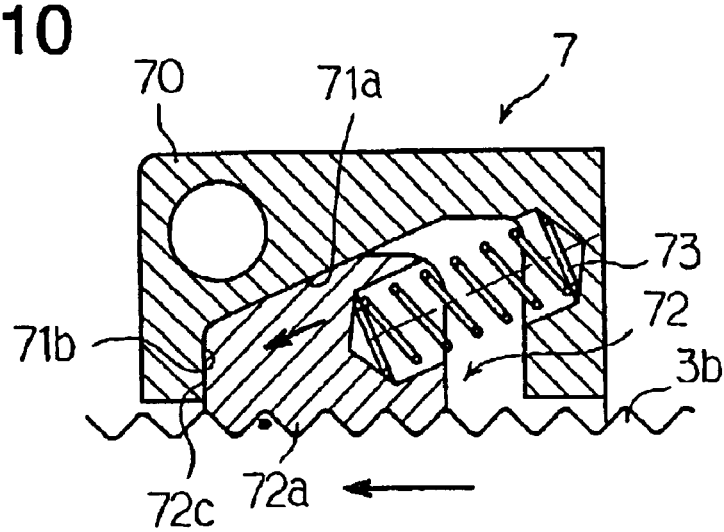
FIG. 10 shows a detail illustrating the operation of the ratchet mechanism at the time of retraction of the plunger.

At the time of backward movement of the plunger 3, shown in FIG. 10, the slider 72 travels in the backward direction of the plunger 3 along the slide surface 71a of the supporting block 70 through engagement between the rack teeth 3b of the plunger 3 and the ratchet portion 72a of the slider 72. Thus, the wedge-shaped slider 72 develops a "wedge effect" between the plunger 3 and the slide surface 71a of the slider housing portion 71 of the supporting block, thereby preventing the rearward movement of the plunger 3 securely.

During the operation of the tensioner 1, since the slider 72 travels along the inclined slide surface 71a of the supporting block 70, the slider 72 travels within the range of the maximum backlash Bm, which is greater than a backlash between the ratchet portion and the rack teeth 3b. Thereby, the amount of the backlash of the whole ratchet mechanism can be increased and adequate backlash can be secured.

In the case of inadequate fluid pressure in the chamber 20, such as at the engine start, a compressive force is applied to the distal end portion 3c of the plunger 3 from the chain, similarly, the wedge-shaped slider 72 develops the "wedge-effect" between the plunger 3 and the slide surface 71a of the slider housing portion 71 of the supporting block 70 and the rear end surface 72c of the slider 72 contacts the stop surface 71b of the supporting block 70, shown in FIG. 10. Thereby, the movement of the slider 72 is prevented and the retraction of the plunger 3 can be securely prevented.

In the case of the retracted state of the plunger 3 with the plunger 3 disengaged from the slider 72, such as at the time of transportation or installation of the tensioner, as shown in FIG. 3, a disengaging pin 10 is inserted into the first through hole 25 formed in the housing 2. Thus, the rear end surface 72c of the slider 72 and the stop surface 71b of the slider housing portion 71 are separated, and the engagement between the ratchet portion 72a of the slider 72 and the rack teeth 3b of the plunger 3 is disengaged. From this condition, by pushing the plunger 3 into the housing, the plunger 3 may be placed in a retracted state with ease. With the distal end portion 3c of the plunger 3 pressed so as not to protrude the plunger 3, the disengaging pin 10 is extracted from the first through hole 25 and the retaining pin 11 is inserted into the second through hole 26 formed in the housing, as shown in FIG. 4. Thereby, the ratchet portion 72a of the slider 72 and the rack teeth 3b of the plunger 3 are re-engaged, thus maintaining the retracted state of the plunger 3. After the tensioner is fitted to the chain, the tensioner is placed in an operable condition by extracting the retaining pin 11 from the second through hole 26.

According to the present invention, the rack teeth 3b are formed around the outer circumference of the plunger 3, thus eliminating the necessity for providing a rack member aside from the plunger 3, which reduces the number of components. Also, since the slider 72 travels along the inclined slide surface 71a of the slide housing portion 71a, a sufficient backlash for the whole ratchet mechanism may be acquired. Moreover, since the wedge-shaped slider 72 develops a "wedge-effect" between the slide surface 71a and the plunger 3 at the time of retraction of the plunger 3, the retraction of the plunger 3 may be securely prevented.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for applying tension to a chain comprising:

a housing having a central bore open at one end thereof;

a hollow plunger, slidably received in the bore of the housing, having an inside space forming a fluid chamber with the bore, the plunger having rack teeth at least at a portion of an outer circumferential surface thereof;

a first biasing member, biasing the plunger in a protruding direction;

a slider housing portion in a supporting block of the housing having an inclined slide surface;

a wedge-shaped slider within the slider housing portion having a first side surface with a ratchet portion adapted to engage with the rack teeth of the plunger and a second side surface, inclined relative to and disposed opposite the first side surface, the inclined surface of the slider being slidable along the inclined surface of the slider housing portion and in a direction crossing an axial centerline of the plunger, to prevent travel of the plunger in a backward direction by a wedge-effect; and a second biasing member in the slider housing portion biasing the slider in a direction of engagement of the ratchet portion of the slider with the rack teeth of the plunger;

such that the second biasing member biases the slider in such a way that the slider moves along the inclined slide surface of the slider housing portion of the supporting block.

2. The hydraulic tensioner according to claim 1, wherein the second biasing member is a coil spring and an axial centerline of the coil spring is disposed parallel to the inclined slide surface of the slider housing portion.

3. The hydraulic tensioner according to claim 1, wherein the slider housing portion has a rear stop surface adapted to contact a rear side surface of the slider to block travel of the slider in a backward direction.

4. The hydraulic tensioner according to claim 3, wherein the slider housing portion has a front facing wall oppositely disposed to a front side surface of the slider, and one end of the second biasing member contacts the front facing wall of the slider housing portion and the other end of the second biasing member contacts the front side surface of the slider.

5. The hydraulic tensioner according to claim 4, wherein the housing has a first through hole adapted to insert a disengaging pin thereinto between the rear side surface of the slider and the rear stop surface of the slider housing portion to disengage engagement of the ratchet portion of the slider with the rack teeth of the plunger, and the housing has a second through hole adapted to insert a retaining pin thereinto between the front side surface of the slider and the front facing wall of the slider housing portion to retain the plunger in a retracted state.

6. The hydraulic tensioner according to claim 5, wherein the disengaging pin and the retaining pin are the same pin having a tapered distal end.

7. The hydraulic tensioner according to claim 1, further comprising a check valve provided at a bottom portion of the central bore of the housing, the check valve being adapted to permit fluid flow into the chamber but to block reverse flow of fluid.

* * * * *

UNITED STATES PATENT AND TRADEMARK OFFICE
CERTIFICATE OF CORRECTION

PATENT NO. : 6,767,302 B2
DATED : July 27, 2004
INVENTOR(S) : Shin Seungpyo

It is certified that error appears in the above-identified patent and that said Letters Patent is hereby corrected as shown below:

<u>Title page,</u>
Item [73], Assignee, should read -- Borgwarner Morse Tec Japan K.K. --.

Signed and Sealed this

Eighth Day of November, 2005

JON W. DUDAS
*Director of the United States Patent and Trademark Office*